（12）United States Patent
Lee et al.

(10) Patent No.: US 11,132,308 B2
(45) Date of Patent: Sep. 28, 2021

(54) SEMICONDUCTOR DEVICE AND SEMICONDUCTOR SYSTEM

(71) Applicant: SAMSUNG ELECTRONICS CO., LTD., Suwon-si (KR)

(72) Inventors: Chul Lee, Hwaseong-si (KR); Kyung Ho Kim, Seoul (KR); Seok Hwan Kim, Seoul (KR); Joo Young Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/288,633

(22) Filed: Feb. 28, 2019

(65) Prior Publication Data

US 2019/0391938 A1 Dec. 26, 2019

(30) Foreign Application Priority Data

Jun. 20, 2018 (KR) ........................ 10-2018-0070759

(51) Int. Cl.
*G06F 13/16* (2006.01)
*G06F 13/24* (2006.01)
*G06F 13/28* (2006.01)

(52) U.S. Cl.
CPC .......... *G06F 13/1668* (2013.01); *G06F 13/24* (2013.01); *G06F 13/28* (2013.01)

(58) Field of Classification Search
None
See application file for complete search history.

(56) References Cited

U.S. PATENT DOCUMENTS

| 6,112,252 | A | 8/2000 | Hausman et al. |
| 7,702,610 | B2* | 4/2010 | Zane .................. G06F 16/2448 |
| | | | 707/999.001 |
| 8,250,271 | B2 | 8/2012 | Swing et al. |
| 9,052,938 | B1* | 6/2015 | Bhide ................ G06F 11/3409 |
| 9,122,588 | B1* | 9/2015 | Mondal .............. G06F 12/0871 |
| 9,720,860 | B2 | 8/2017 | Rose et al. |
| 9,841,916 | B2* | 12/2017 | Cho ...................... G06F 3/0638 |
| 10,061,703 | B2* | 8/2018 | Gschwind ............ G06F 8/4442 |
| 10,642,505 | B1* | 5/2020 | Kuzmin ................ G06F 3/0685 |
| 2006/0045109 | A1 | 3/2006 | Blackmore et al. |
| 2006/0059287 | A1* | 3/2006 | Rivard .................. G06F 9/4411 |
| | | | 710/300 |
| 2008/0059668 | A1* | 3/2008 | Charrat .............. G06F 13/4243 |
| | | | 710/110 |
| 2008/0212370 | A1* | 9/2008 | Tokiwa .................. G11C 16/06 |
| | | | 365/185.09 |

(Continued)

FOREIGN PATENT DOCUMENTS

KR 10-1209919 12/2012

*Primary Examiner* — Henry Tsai
*Assistant Examiner* — Christopher A Bartels
(74) *Attorney, Agent, or Firm* — F. Chau & Associates, LLC

(57) ABSTRACT

Provided are a semiconductor device and a semiconductor system. A semiconductor device includes a non-volatile memory; a device interface circuit which receives an input/output (I/O) request from a host; and a device controller which executes a data access according to the I/O request on the non-volatile memory, and transmits an interrupt to the host a predetermined time before completion of the data access.

20 Claims, 17 Drawing Sheets

(56) References Cited

U.S. PATENT DOCUMENTS

| | | | | |
|---|---|---|---|---|
| 2008/0239811 A1* | 10/2008 | Tanaka | | G11C 11/5621 365/185.11 |
| 2009/0049220 A1* | 2/2009 | Conti | | G06F 13/24 710/267 |
| 2009/0063593 A1* | 3/2009 | Okabayashi | | G06F 3/0607 |
| 2009/0157936 A1* | 6/2009 | Goss | | G06F 1/324 710/264 |
| 2009/0193180 A1* | 7/2009 | Ito | | G06F 13/385 711/103 |
| 2009/0235025 A1* | 9/2009 | Kondo | | G11C 16/10 711/115 |
| 2010/0049878 A1* | 2/2010 | Yu | | G06F 13/385 710/11 |
| 2011/0103224 A1* | 5/2011 | Nishioka | | H04L 5/14 370/235 |
| 2011/0241432 A1* | 10/2011 | Nishioka | | H04L 25/0272 307/80 |
| 2011/0271040 A1* | 11/2011 | Kamizono | | G11C 16/10 711/103 |
| 2011/0276748 A1* | 11/2011 | Toyama | | G06F 9/4403 711/103 |
| 2013/0024647 A1* | 1/2013 | Gove | | G06F 12/084 711/207 |
| 2013/0083611 A1* | 4/2013 | Ware | | G11C 11/4072 365/191 |
| 2015/0120978 A1* | 4/2015 | Kalyanasundharam | | G06F 12/0815 710/267 |
| 2015/0193360 A1* | 7/2015 | Lu | | G06F 13/28 710/48 |
| 2015/0347133 A1* | 12/2015 | Gschwind | | G06F 9/30087 712/239 |
| 2015/0378912 A1* | 12/2015 | Gschwind | | G06F 12/084 711/130 |
| 2016/0139849 A1* | 5/2016 | Chaw | | G06F 3/0611 711/119 |
| 2016/0182154 A1* | 6/2016 | Fang | | H04B 10/2575 398/116 |
| 2016/0342550 A1* | 11/2016 | Brokhman | | G06F 13/3625 |
| 2017/0017516 A1 | 1/2017 | Sato et al. | | |
| 2017/0075834 A1 | 3/2017 | Cha et al. | | |
| 2017/0168853 A1 | 6/2017 | Nampoothiri et al. | | |
| 2017/0336988 A1 | 11/2017 | Kim et al. | | |
| 2019/0065426 A1* | 2/2019 | Das Sharma | | G06F 13/4282 |
| 2019/0149265 A1* | 5/2019 | Das Sharma | | H04L 1/0041 714/776 |
| 2019/0243637 A1* | 8/2019 | Nachimuthu | | G06F 3/0673 |
| 2019/0310913 A1* | 10/2019 | Helmick | | G06F 11/1076 |
| 2019/0342199 A1* | 11/2019 | Hurson | | H04L 43/16 |
| 2020/0061811 A1* | 2/2020 | Iqbal | | G06T 7/73 |
| 2020/0082241 A1* | 3/2020 | Paillet | | G06F 3/0604 |
| 2020/0090383 A1* | 3/2020 | Dwivedi | | G06T 11/006 |
| 2020/0249878 A1* | 8/2020 | Bismuth | | G06F 3/0626 |

* cited by examiner

SEMICONDUCTOR DEVICE AND SEMICONDUCTOR SYSTEM

CROSS-REFERENCE TO RELATED APPLICATION

This U.S. non-provisional application claims the benefit of and priority under 35 U.S.C. § 119 to Korean Patent Application No. 10-2018-0070759, filed on Jun. 20, 2018, in the Korean Intellectual Property Office, the disclosure of which is incorporated by reference in its entirety herein.

BACKGROUND

1. Technical Field

The present disclosure relates to a semiconductor device and a semiconductor system.

2. Discussion of Related Art

A storage system includes a host and a storage device capable of sending and receiving data to and from each other via various interfaces. Examples of these interfaces include UFS (Universal Flash Storage), SCSI (Small Computer System Interface), SAS (Serial Attached SCSI), SATA (Serial Advanced Technology Attachment), PCIe (Peripheral Component Interconnect Express), eMMC (embedded MultiMediaCard), FC (Fiber Channel), ATA (Advanced Technology Attachment), IDE (Integrated Drive Electronics), USB (Universal Serial Bus), and IEEE 1394 (Firewire).

In such a storage system, the host transmits input/output (I/O) requests to the storage device via the interface, and the storage device that has received the I/O requests processes these I/O requests.

The host can determine whether the storage device has completed processing of a given I/O request by polling the storage device or by receiving a message from the storage device that interrupts the host. However, a usage rate of resources of the host may be high in an environment where the storage system is required to process I/O requests at a high speed. Thus, there is a need for a scheme capable of quickly executing the I/O processing, while reducing a usage rate of resources.

SUMMARY

At least one embodiment of the present inventive concept provides a semiconductor device capable of completing I/O processing quickly, while reducing the usage rate of a resource.

At least one embodiment of the present inventive concept provides a semiconductor system capable of completing I/O processing quickly, while reducing the usage rate of a processor.

According to an exemplary embodiment of the present disclosure, there is provided a semiconductor device including a non-volatile memory; a device interface circuit which receives an I/O request from a host; and a device controller which executes a data access according to the I/O request on the non-volatile memory, and transmits an interrupt to the host a predetermined time before completion of the data access.

According to an exemplary embodiment of the present disclosure, there is provided a semiconductor device including a driver which drives a storage device; and a host interface circuit which transmits an I/O request provided from the driver to the storage device, and receives an interrupt from the storage device a predetermined time before completion the storage device of a data access according to the I/O request.

According to an exemplary embodiment of the present disclosure, there is provided a semiconductor device including a host and a storage device connected via an electrical interface, wherein the host transmits an I/O request to the storage device, and receives an interrupt from the storage device a predetermined time before completion of a data access on the storage device according to the I/O request, and the storage device receives the I/O request from the host, performs the data access according to the I/O request on a non-volatile memory, and transmits the interrupt to the host the predetermined time before the completion of the data access.

BRIEF DESCRIPTION OF THE DRAWINGS

The present disclosure will become more apparent by describing in detail exemplary embodiments thereof with reference to the attached drawings, in which.

DETAILED DESCRIPTION OF THE EMBODIMENTS

Figure 1:
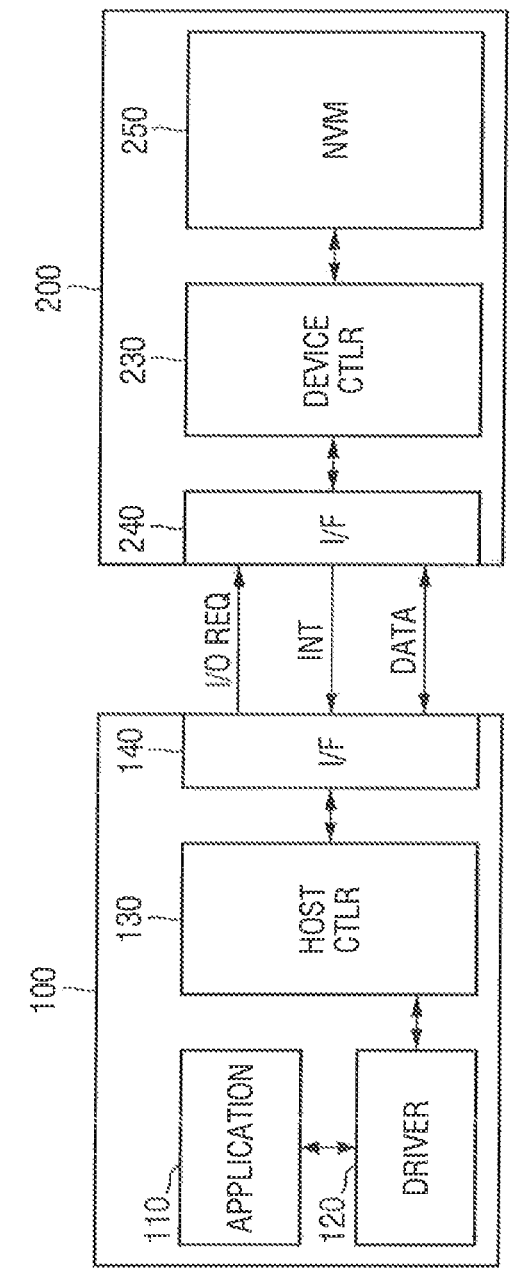
FIG. 1 is a block diagram for explaining a semiconductor system according to an exemplary embodiment of the present disclosure.

Hereinafter, exemplary embodiments of the inventive concept will be described in detail with reference to the accompanying drawings. Embodiments of the inventive concept are provided so that this disclosure will be thorough and complete, and will fully convey the concept of the inventive concept to one of ordinary skill in the art. However, it should be understood that the inventive concept covers all modifications, equivalents, and replacements within the technical scope of the inventive concept. Like reference numerals refer to like elements throughout. The terms of a singular form may include plural forms unless referred to the contrary.

FIG. 1 is a block diagram for explaining a semiconductor system according to an exemplary embodiment of the present disclosure.

Referring to FIG. 1, a semiconductor system 1 according to an exemplary embodiment of the present disclosure includes a host 100 (e.g., a host device) and a storage device 200.

In some embodiments of the present disclosure, the host 100 and the storage device 200 are connected to each other, via electrical interfaces such as UFS (Universal Flash Storage), SCSI (Small Computer System Interface), SAS (Serial Attached SCSI), SATA (Serial Advanced Technology Attachment), PCIe (Peripheral Component Interconnect Express), eMMC (embedded MultiMediaCard), FC (Fiber Channel), ATA (Advanced Technology Attachment), IDE (Integrated Drive Electronics), USB (Universal Serial Bus), or IEEE 1394 (Firewire). However, the scope of the present disclosure is not limited thereto, but may be applied to an arbitrary interface that allows data to be transmitted and received between the host 100 and the storage device 200.

The host 100 includes an application 110, a driver 120, a host controller 130 (e.g., a control circuit) and a host interface unit 140 (e.g., an interface circuit). The application 110 and the driver 120 may be stored in a memory of the host 100 and executed by a processor of the host 100. For example, the processor may be located in the host controller 130.

In an embodiment of the present disclosure, the host 100 further includes a buffer memory. The buffer memory may be used as a main memory of the host 100, or may be used as a cache memory, a temporary memory for temporarily storing data. For example, the application 110 and the driver 120 may be stored in the main memory. In an embodiment of the present disclosure, the buffer memory is a volatile memory including a DRAM (Dynamic Random Access Memory), but the scope of the present disclosure is not limited thereto.

The application 110 is executed by the host 100 and may control the semiconductor system 1 based on a set of commands usable in the semiconductor system 1.

The driver 120 may drive the storage device 200 connected to the host 100. In an embodiment, the driver 120 receives an I/O request for controlling the storage device 200 from the application 110, processes the I/O request using the host controller 130, and then may provide the processing result to the application 110.

The application 110 and the driver 120 may be implemented by software, but the scope of the present disclosure is not limited thereto.

The host controller 130 controls the overall operations inside the host 100. For example, the host controller 130 may transmit data stored in the buffer memory to the storage device 200 via the host interface unit 140 in response to the write request received from the driver 120. Further, the host controller 130 may also receive data from the storage device 200 via the host interface unit 140 in response to a read request received from the driver 120.

The host interface unit 140 may receive and transmit data from and to the device interface unit 240 of the storage device 200 via a data line connecting the host 100 and the storage device 200.

In an embodiment of the present disclosure, the host interface unit 140 and the device interface unit 240 include a physical layer that directly transmits and receives data between the host 100 and the storage device 200, and a data transfer layer capable of generating and managing packets of data to be transmitted between the host 100 and the storage device 200, but the scope of the present disclosure is not limited thereto.

The storage device 200 includes a device controller 230, a device interface unit 240, and a non-volatile memory (NVM) 250.

The device controller 230 controls the overall operations inside the storage device 200. For example, the device controller 230 may perform operations of writing, reading or erasing the data requested by the host 100 on the non-volatile memory 250. To this end, like the host 100, the storage device 200 may further include a buffer memory. The device controller 230 may include a processor to perform the above-described operations.

The non-volatile memory 250 may include a flash memory, an MRAM (Magnetoresistive Random Access Memory), a PRAM (Phase-change Random Access Memory), or FeRAM (Ferroelectric Random Access Memory), but the scope of the disclosure is not limited thereto.

As described above, the driver 120 receives the I/O request for controlling the storage device 200 from the application 110. Here, the I/O request may include the read request for reading data from the storage device 200 or a write request for writing data to the storage device 200.

The driver 120 may transmit the I/O request to the storage device 200. For example, the driver 120 may transfer an I/O request to the host controller 130, and the host controller 130 may transfer the I/O request to the storage device 200 via the host interface unit 140. That is, the host interface unit 140 may transmit the I/O request provided from the driver 120 to the storage device 200.

Thereafter, the driver 120 may wait until the storage device 200 completes the processing of the I/O request. As an example, the driver 120 may wait, while executing polling to check whether or not the storage device 200 has completed the processing of the I/O request. In an embodiment, the storage device 200 sets a register to a value that indicates it has completed processing of the I/O request, and the polling includes the driver 120 periodically checking the value of the register to determine whether the processing has completed. In an embodiment, the register is located in the storage device 200. When the storage device 200 recognizes that the processing of the I/O request has been completed during execution of the polling, the driver 120 may execute one or more subsequent operations that rely on the results of the processing completed by the storage device 200. For example, if the processing read data from the storage device and transferred the read data to the host interface unit 140, a subsequent operation could be for the driver 120 to perform a calculation using the read data.

As another example, the driver 120 may wait in a sleep state, until the storage device 200 completes the processing of the I/O request. When an interrupt in which the processing of the I/O request has been completed is received from the storage device 200, the driver 120 is woken up. The woken-up driver 120 may execute one or more subsequent operations that rely on results of the processing completed by the storage device 200. For example, the storage device 200 may send an interrupt message (e.g., an interrupt) across an interrupt line to the host 100 upon completing the processing that causes the driver 120 to exit the sleep state.

For example, the subsequent operations may include an operation that provides the application 110 with the data read and transmitted from the non-volatile memory 250 by the storage device 200, or an operation that provides information to the application 110 indicating whether an error occurred during the processing of the I/O request by the storage device 200.

However, since the above-described polling type continues to use a resource of the host 100 (e.g., a processor of the host 100) until the driver 120 recognizes that the device 200 has completed the processing of the I/O request, the usage rate of the resource increases. On the other hand, in the interrupt type described above, since the driver 120 waits in the sleep state until the storage device 200 completes the processing of the I/O request, the usage rate of the resource does not increase.

However, in the interrupt type, because the storage device 200 needs to generate an interrupt and transmit it to the host 100 so that the driver 120 is notified that the processing of the I/O request has completed, and because it takes some time to wake-up the driver 120 from the sleep state after receiving the interrupt, a latency (e.g., a delay) is experienced.

The host 100 according to an exemplary embodiment of the present disclosure transmits the I/O request to the storage device 200, and receives the interrupt from the storage device 200 a predetermined time before completion of the data access according to the I/O request, thereby reducing latency. In other words, the storage device 200 according to an embodiment of the present disclosure receives the I/O request from the host 100 and performs the data access according to the I/O request on the non-volatile memory 250, but the storage device 200 transmits the interrupt to the host 100 a predetermined time before completion of the data access.

That is, before the processing of the I/O request has completed, the storage device 200 generates an interrupt in advance, and the driver 120 that was in the sleep state is caused to wake up near the time when the processing of the I/O request is completed, thereby making it possible to reduce the above-described delay.

This will be described in detail with reference to FIGS. 2 to 5.

Figure 2:
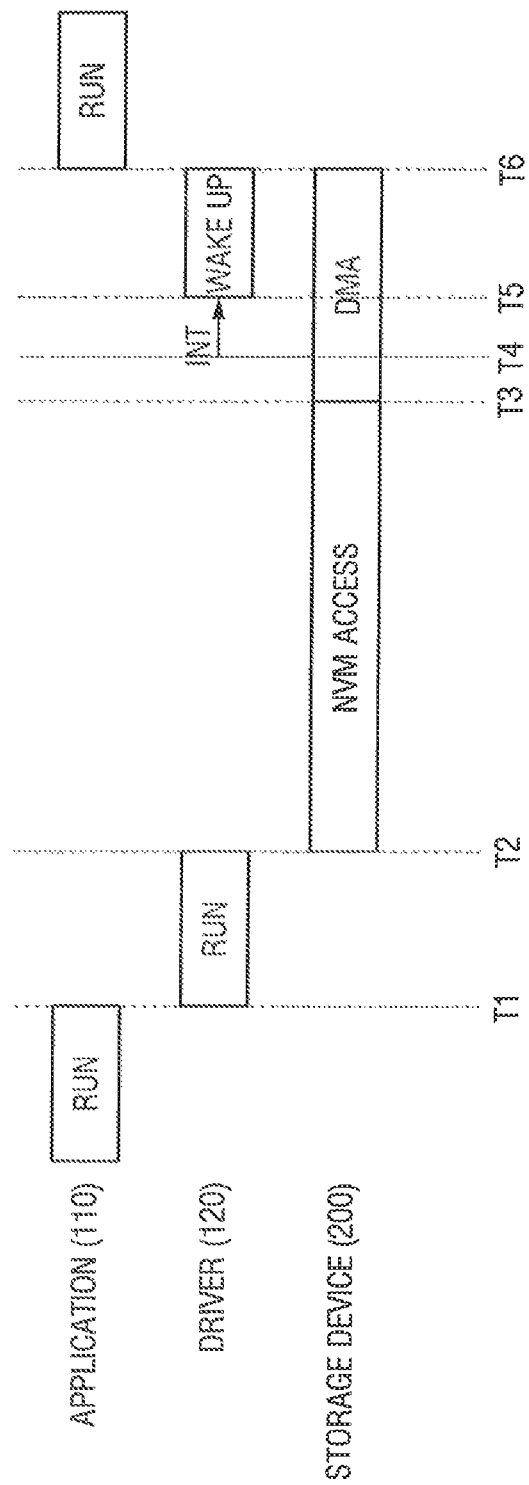
FIG. 2 is a diagram for explaining the operation of the semiconductor system according to an exemplary embodiment of the present disclosure.

FIG. 2 is a diagram for explaining the operation of the semiconductor system according to an embodiment of the present disclosure.

Referring to FIG. 2, prior to time T1, the driver 120 of the host 100 receives an I/O request for controlling the storage device 200 from the application 110. At time T1, for example, the driver 120 transmits the I/O request to the storage device 200 via the host interface unit 140.

At time T2, the storage device 200 receives the I/O request from the host 100, for example, via the device interface unit 240. Then, the device controller 230 performs the data access according to the I/O request on the non-volatile memory 250.

Specifically, at intervals T2 to T3, the device controller 230 performs the data access such as a read, a write, or an erase on the non-volatile memory 250.

At intervals T3 to T6, the device controller 230 may transmit data due to the data access to the host 100. For example, the device controller 230 may transmit the data read from the non-volatile memory 250 to the host 100 when the data access corresponds to a read request. At the same time, the host 100 may receive data due to the data access from the storage device 200, for example, via the host interface unit 140.

In particular, at time T4, the device controller 230 of the storage device 200 transmits an interrupt to the host 100 a predetermined time before completion of the data access. For example, when the data access corresponds to a read request, the data access may be considered completed after the data read from the storage device 200 has been completely transmitted to the host 100. Further, the host interface unit 140 of the host 100 receives the interrupt from the storage device 200 a predetermined time before completion of the data access according to the I/O request, and starts to wake-up. Thus, even though the storage device 200 has not actually completed the data access, it may send an interrupt to the host 100 indicating it has completed the data access. For example, the storage 200 may send the interrupt to the host 100 a predetermined time after beginning to process the data access but before completing the data access.

In an exemplary embodiment, the device controller 230 of the storage device 200 transmits the interrupt to the host 100 during transmission of data due to the data access to the host 100, and the driver 120 of the host 100 receives the interrupt via the host interface unit 140 while receiving the data due to the data access from the storage device 200. Further, the device controller 230 enters the wake-up state before data transmission due to the data access has completed.

Next, at time T6, the device controller 230 may provide the application 110 with, for example, the data read and transmitted by the storage device 200 from the non-volatile memory 250, as a subsequent work of the processing completed by the storage device 200.

According to the present embodiment, before the processing according to the I/O request has completed, the storage device 200 generates the interrupt in advance, and in the vicinity of the time when the processing according to the I/O request has completed, the driver 120 in the sleep state is caused to wake up, thereby making it possible to reduce the latency. In an exemplary embodiment, the data access is designed so that it completes within a certain amount of time after the interrupt is received by the host 100, where the certain amount of time is an amount of time it takes for the driver 120 to wake up.

Figure 3:
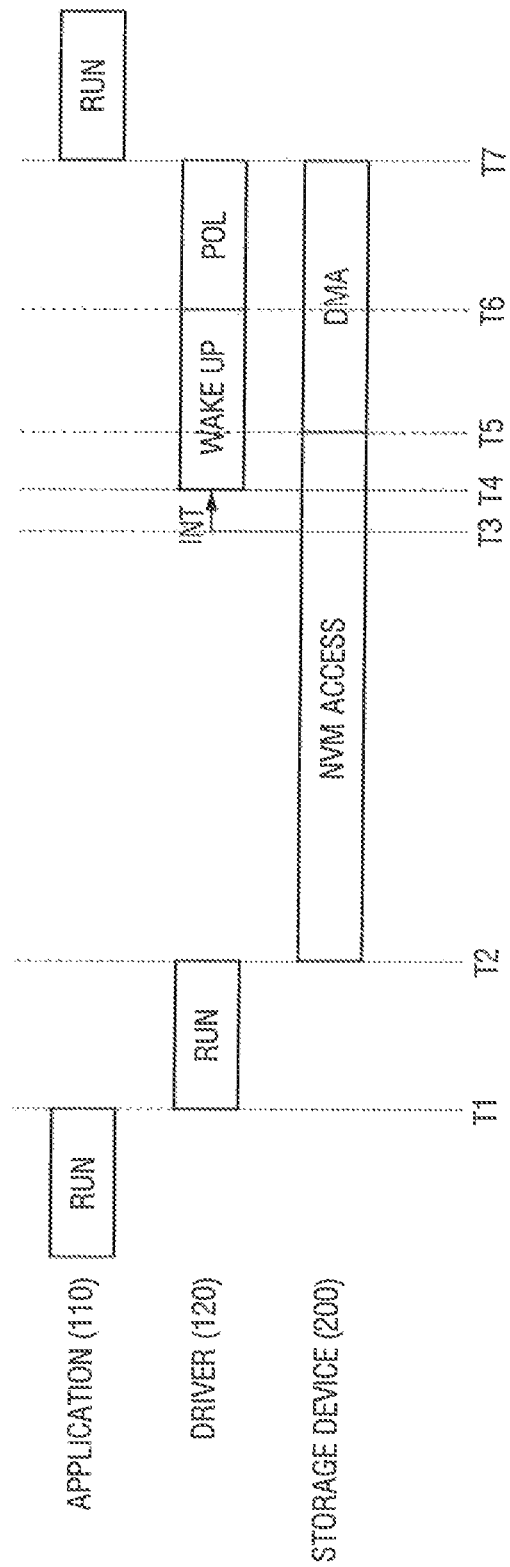
FIG. 3 is a diagram for explaining the operation of the semiconductor system according to an exemplary embodiment of the present disclosure.

FIG. 3 is a diagram for explaining the operation of the semiconductor system according to an embodiment of the present disclosure.

FIG. 3 differs from the embodiment of FIG. 2 in that an interrupt transmission time is earlier than that of FIG. 2. Accordingly, the driver 120 may perform additional polling after entering the wake-up state well before the processing of the I/O request has completed.

Specifically, at intervals T2 to T5, the device controller 230 may perform the data access such as a read, a write, or an erase on the non-volatile memory 250.

At intervals T5 to T7, the device controller 230 may transmit the data to the host 100 due to the data access. For example, the device controller 230 may transmit the data, which is read from the non-volatile memory 250, to the host 100. At the same time, the host 100 may receive data due to the data access from the storage device 200, for example, via the host interface unit 140.

In particular, at time T3, the device controller 230 of the storage device 200 transmits the interrupt to the host 100 a predetermined time before completion of the data access. For example, when the data access is a read, the device controller 230 transmits the interrupt before all of the data corresponding to the read has been retrieved from the storage device 200. Also, the host interface unit 140 of the host 100 receives the interrupt from the storage device 200 a predetermined time before completion of the data access according to the I/O request at time T4, and starts to wake-up.

At time T6, the wake-up of the driver 120 completes. However, the data transmission of the storage device 200 is still in progress. In such a case, the driver 120 performs additional polling during the interval T6 to T7 to determine whether or not the data transmission has completed.

Unlike the embodiment of FIG. 2, this embodiment illustrates a case where the device controller 230 of the storage device 200 transmits the interrupt to the host 100 during execution of a data access on the non-volatile memory 250, and the driver 120 of the host 100 receives the interrupt via the host interface unit 140 before data associated with the data access has begun to be received from the storage device 200.

However, the scope of the present disclosure is not limited thereto, and as illustrated in FIG. 2, even when an interrupt occurs during transmission of the data due to the data access (that is, at any time in intervals T5 to T7), before the completion of the data transmission of the storage device 200, when the wake-up of the driver 120 has completed, additional polling during intervals T6 to T7 may be executed.

Next, at time T7, the device controller 230 may provide the application 110 with the data read and transmitted by the storage device 200 from the non-volatile memory 250, as a subsequent work of the processing completed by the storage device 200.

According to the present embodiment, before the processing of the I/O request has completed, the storage device 200 generates the interrupt in advance, and in the vicinity of the time when the processing of the I/O request has completed, the driver 120 that is in the sleep state is caused to wake up, thereby making it possible to reduce the latency.

Figure 4:
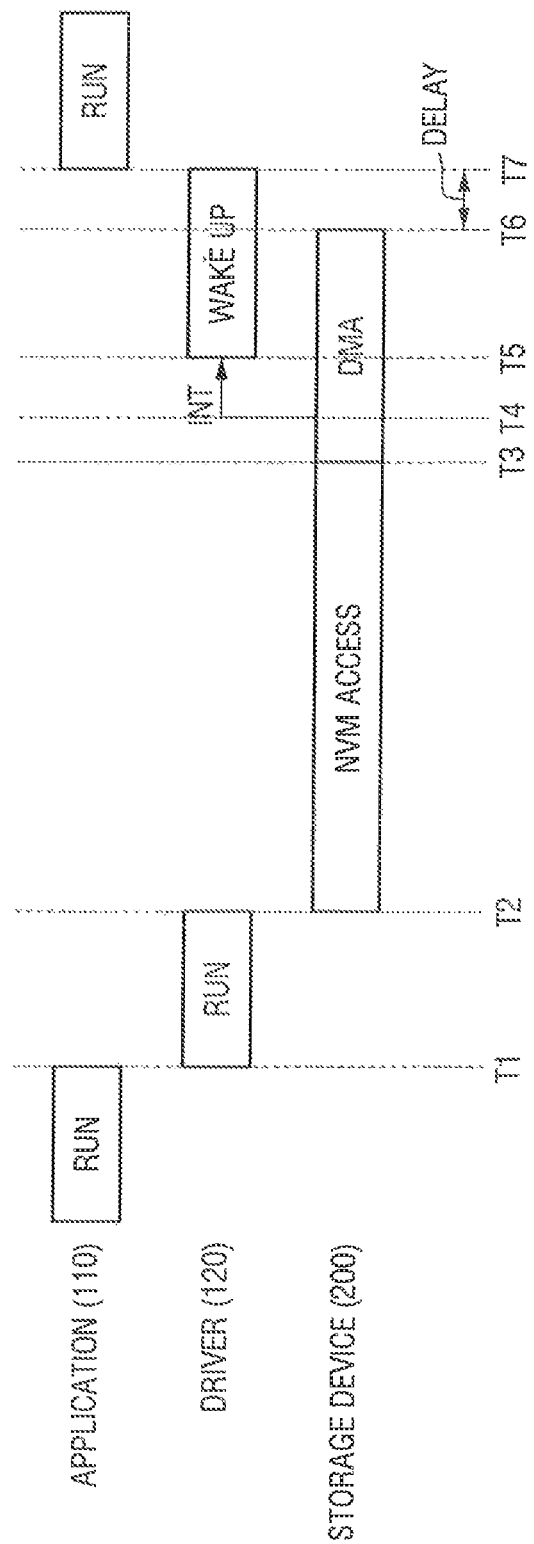
FIG. 4 is a diagram for explaining the operation of the semiconductor system according to an exemplary embodiment of the present disclosure.

FIG. 4 is a diagram for explaining the operation of the semiconductor system according to an embodiment of the present disclosure.

FIG. 4 differs from the embodiment of FIG. 2 in that the transmission time point of the interrupt is later than that of FIG. 2. Accordingly, in the present embodiment, a delay corresponding to intervals T6 to T7 is generated. For example, the driver 120 wakes up a certain period of time after data transmission to the host 100 has completed.

Specifically, at intervals T2 to T3, the device controller 230 performs the data access such as a read, a write, or an erase on the non-volatile memory 250. At intervals T3 to T6, the device controller 230 may transmit the data due to the data access to the host 100.

In particular, at time T4, the device controller 230 of the storage device 200 transmits the interrupt to the host 100 a predetermined time before completion of the data access. Further, the host interface unit 140 of the host 100 receives the interrupt from the storage device 200 a predetermined time before of completion of the data access according to the I/O request at time T5, and starts to wake-up.

At time T6, the data transmission of the storage device 200 completes. However, wake-up of the driver 120 is still in progress. In such a case, a delay corresponding to the interval T6 to T7 may be generated.

Next, at time T7, the device controller 230 may provide the application 110 with, for example, the data read and transmitted by the storage device 200 from the non-volatile memory 250, as a subsequent work of the processing completed by the storage device 200.

According to the present embodiment, before the processing of the I/O request has completed, the storage device 200 generates the interrupt in advance, and in the vicinity of the time when the processing of according to the I/O request has completed, the driver 120 which is in the sleep state is caused to enter the wake up state, thereby making it possible to reduce latency, even if a delay corresponding to the interval T6 to T7 occurs.

Figure 5:
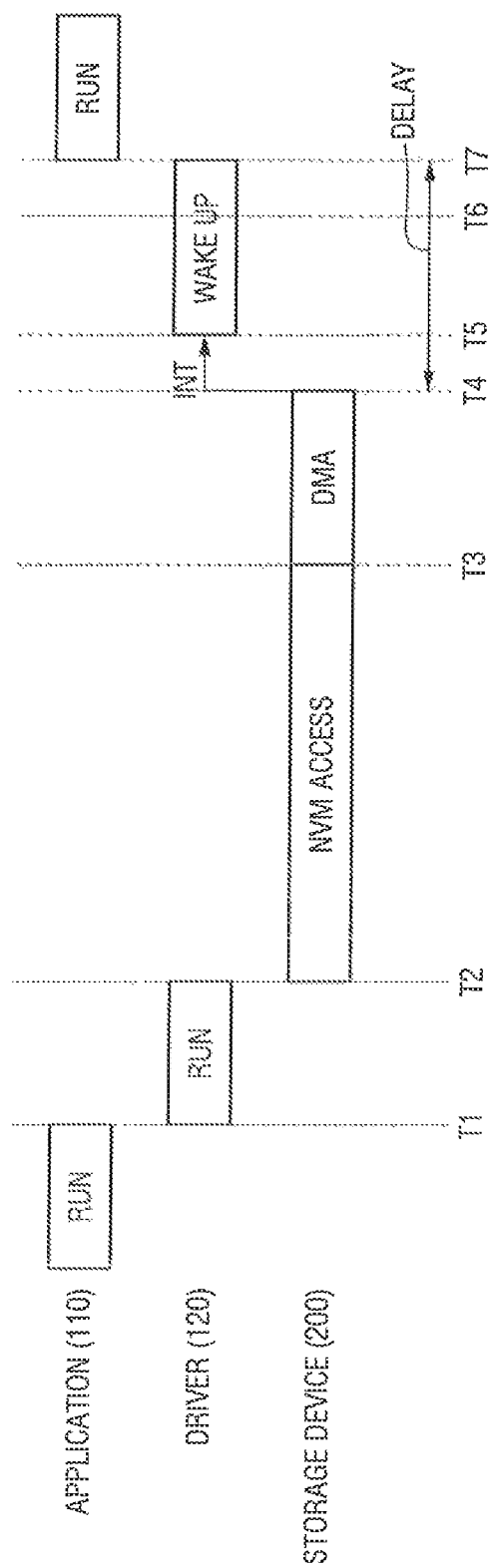
FIG. 5 is a diagram for explaining the operation of the semiconductor system according to an exemplary embodiment of the present disclosure.

FIG. 5 is a diagram for explaining an operation of the semiconductor system according to an embodiment of the present disclosure.

The embodiment illustrated in FIG. 5 illustrates a worst case where the transmission time of the interrupt occurs after the data transmission of the storage device 200 has completed. Compared with FIG. 2 illustrating the best case, a delay corresponding to intervals T4 to T7 may be generated.

According to the present embodiment, the storage device 200 generates the interrupt in advance before the processing of the I/O request has completed. Therefore, in order to avoid such a worst case, it is necessary to appropriately determine the above-mentioned predetermined time.

Figure 6:
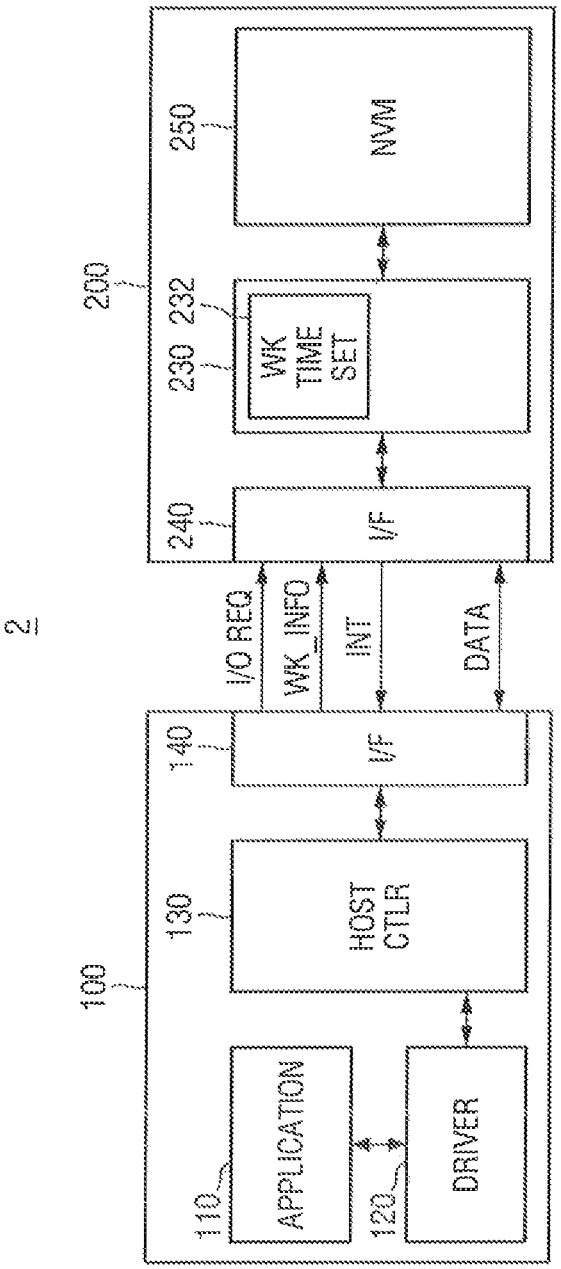
FIG. 6 is a block diagram for explaining the semiconductor system according to an exemplary embodiment of the present disclosure.
Figure 7:
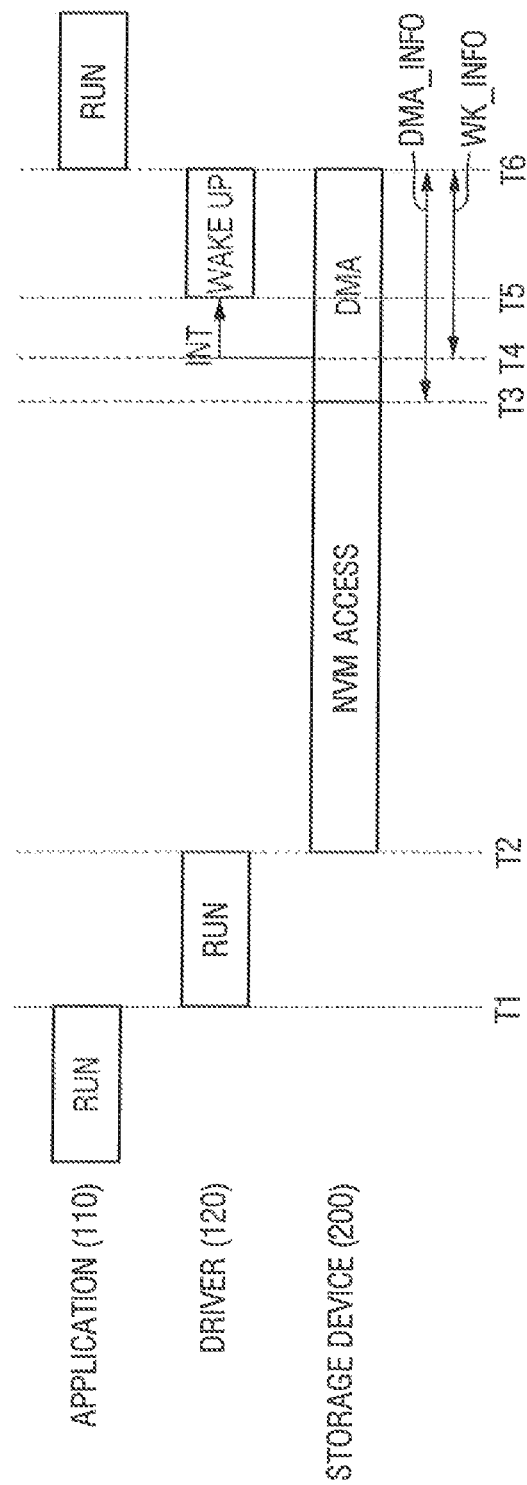
FIG. 7 is a diagram for explaining the operation of the semiconductor system according to an exemplary embodiment of the present disclosure.

Referring now to FIGS. 6 to 7, an example method for appropriately determining the predetermined time will be described.

FIG. 6 is a block diagram for explaining the semiconductor system according to an embodiment of the present disclosure, and FIG. 7 is a diagram for explaining the operation of the semiconductor system according to an embodiment of the present disclosure.

Referring to FIG. 6, a semiconductor system 2 according to an embodiment of the present disclosure is different from the semiconductor system 1 of FIG. 1 in that the host 100 provides the wakeup time information WK_INFO to the storage device 200.

Specifically, the driver 120 of the host 100 transmits wakeup time information WK_INFO, which includes information on the time taken until the driver 120 wakes up from the sleep state via the host interface unit 140, to the storage device 200.

Then, the device controller 230 receives the wakeup time information WK_INFO via the device interface unit 240, and determines the predetermined time based on the wakeup time information WK_INFO. In this embodiment, the device controller 230 includes a wakeup time setting module 232, and the wakeup time setting module 232 determines the predetermined time based on the received wakeup time information WK_INFO.

Here, the wakeup time information WK_INFO refers to the time information (e.g., time) taken until the driver 120 of the host 100 completes the wakeup after receiving the interrupt during the sleep state. For example, the wakeup time information WK_INFO may be expressed as a numerical value obtained by arithmetically predicting the time taken up to complete the wakeup after receiving the interrupt. For example, the wakeup time information WK_INFO may be expressed as a numerical value obtained by averaging the past time taken up to complete the wakeup after receiving the interrupt. The wakeup time information WK_INFO may be collectively referred to as information for appropriately calculating a predetermined time for the device controller 230 to generate the interrupt in advance, and its specific expression method or operation method are not limited to a specific method.

Next, referring to FIG. 7, the wakeup time setting module 232 determines a predetermined time for generating the interrupt in advance by the device controller 230, based on the received wakeup time information WK_INFO.

For example, if the time value extracted from the received wakeup time information WK_INFO is set as "10", the wakeup time setting module 232 may set the storage device 200 so that the device controller 230 generates the interrupt before time of "10" from the time T6. In other words, the wakeup time setting module 232 may set the operation of the device controller 230 so that intervals T4 to T6 correspond to the time of "10". The time value may indicate a certain number of clock cycles as an example.

In some embodiments of the present disclosure, the wakeup time setting module 232 receives DMA time information DMA_INFO including information on the time for transmitting the data due to the data access to the host 100. In an embodiment, the wakeup time setting module 232 determines a predetermined time for the device controller 230 to generate the interrupt in advance, based on the wakeup time information WK_INFO and the DMA time information DMA_INFO.

Here, the DMA time information DMA_INFO refers to time information (e.g., time) taken until the device controller 230 of the storage device 200 completes the transmission to the data host 100 due to the data access. For example, the DMA time information DMA_INFO may be expressed as a numerical value obtained by arithmetically predicting the time taken until transmission to the data host 100 due to the data access has completed. For example, the DMA time information DMA_INFO may be expressed as a numerical value obtained by averaging the past times taken until transmission to the data host 100 due to the data access has completed. In other words, the DMA time information DMA_INFO may be collectively referred to as information for appropriately calculating a predetermined time for the device controller 230 to generate the interrupt in advance in the same way as the wakeup time information WK_INFO, and its specific expression method or calculation method is not limited to a particular method.

For example, if the time value extracted from the received wakeup time information WK_INFO is "10" and the time value extracted from the DMA time information DMA_INFO is "14", the wakeup time setting module 232 may set the storage device 200 so that the device controller 230 generates the interrupt as soon as time "4" elapses from the time T3. In other words, the wakeup time setting module 232 may set the operation of the device controller 230 so that intervals T3 to T4 correspond to the time of "4". For example, the wakeup time information WK_INFO can be subtracted from the DMA time information DM INFO to generate a result, and the result can be added to the time at which the storage device 200 completes processing of an I/O request to generate an interrupt start time, and then the storage device 200 can output the interrupt to the host 100 at the interrupt start time.

By appropriately determining the predetermined time for generating the interrupt in advance in this way, the worst case illustrated in FIG. 5 may be avoided. However, it should be noted that embodiments of the disclosure are not limited to use of the wakeup time information WK_INFO and/or DMA time information DMA_INFO to avoid the worst case. In an embodiment, the host 100 includes different pins for outputting the wakeup time information WK_INFO and the DMA time information DMA_INFO to the storage device 200. In an embodiment, the storage device 200 includes different pins for receiving the wakeup time information WK_INFO and the DMA time information DMA_INFO from the host 100

Example methods of transmitting the wakeup time information WK_INFO between the host 100 and the storage device 200 will now be described referring to FIGS. 8 to 10.

Figure 8:
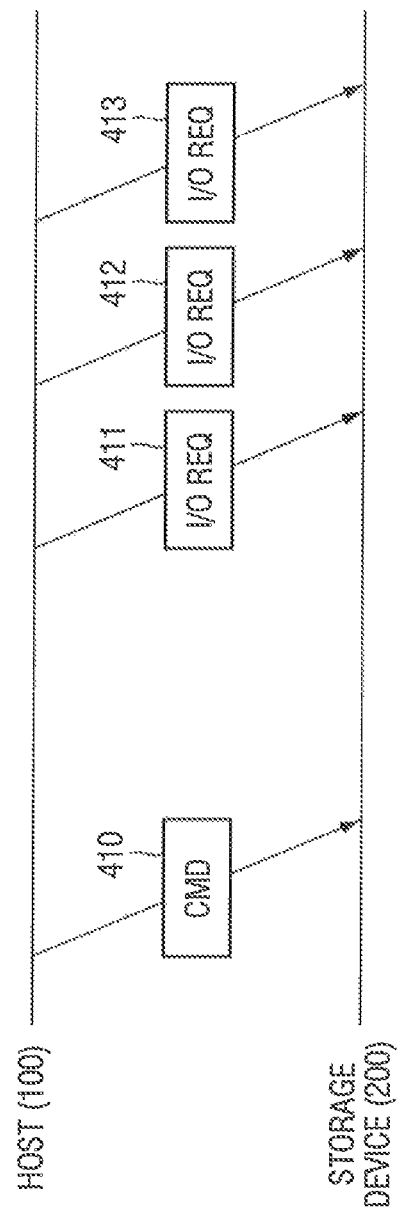
FIG. 8 is a diagram for explaining the operation of the semiconductor system according to an exemplary embodiment of the present disclosure.

FIG. 8 is a diagram for explaining an operation of the semiconductor system according to an embodiment of the present disclosure.

Referring to FIG. 8, the wakeup time information WK_INFO is transmitted from the host 100 to the device 200 in the form of another command or in the form of an administrator command, at the same particular time as an initialization time of the storage device 200. In an embodiment, the storage device 200 is initialized during the initialization time, and this initialization occurs when the storage device is powered on or when the storage device is refreshed.

Specifically, after the driver 120 of the host 100 transmits the command 410 including the wakeup time information WK_INFO via the host interface unit 140, and then, the driver 120 may transmit one or more I/O requests 411, 412 and 413.

After receiving the command 410 including the wakeup time information WK_INFO from the host 100 via the device interface unit 240, the device controller 230 may receive one or more I/O requests 411, 412 and 413.

Then, the device controller 230 may set a predetermined time for generating an interrupt in advance on one or more of the I/O requests 411, 412 and 413, based on the wakeup time information WK_INFO included in the command 410.

Figure 9:
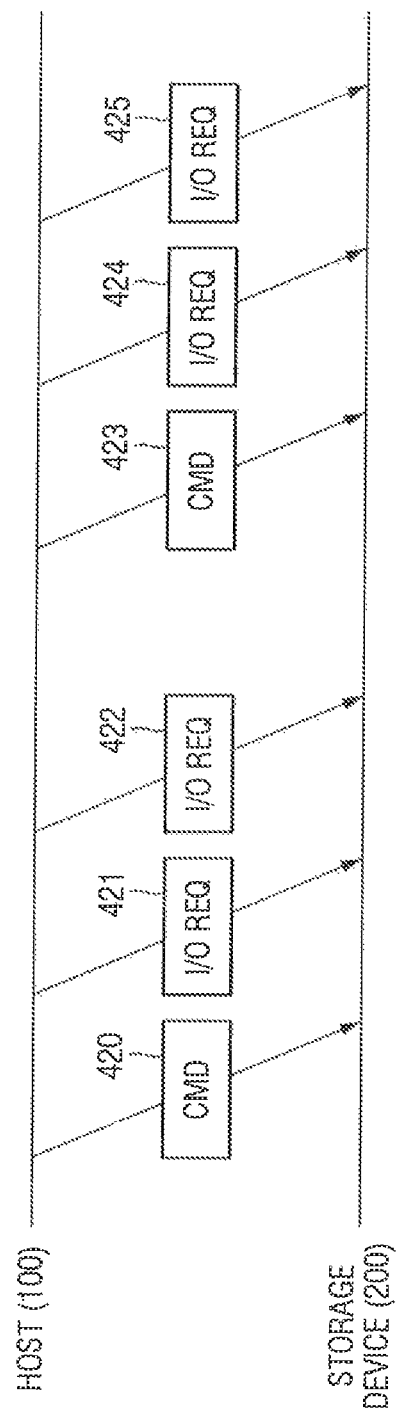
FIG. 9 is a diagram for explaining the operation of the semiconductor system according to an exemplary embodiment of the present disclosure.

FIG. 9 is a diagram for explaining an operation of the semiconductor system according to an embodiment of the present disclosure.

Referring to FIG. 9, the wakeup time information WK_INFO is periodically transmitted from the host 100 to the device 200 in the form of another command during operation of the storage device 200.

Specifically, the driver 120 of the host 100 transmits the first command 420 including the wakeup time information WK_INFO of one or more first I/O requests 421 and 422 via the host interface unit 140, and then transmits the second command 423 including the wakeup time information WK_INFO of one or more second I/O requests 424 and 425.

The device controller 230 receives the first command 420 including the wakeup time information WK_INFO of one or more first I/O requests 421 and 422 from the host 100 via the device interface unit 240, and then receives the second command 423 including the wakeup time information WK_INFO of one or more second I/O requests 424 and 425.

Then, the device controller 230 sets a predetermined time for generating an interrupt in advance on one or more first I/O requests 421 and 422, based on the wakeup time information WK_INFO included in the first command 420, and sets a predetermined time for generating an interrupt in advance on one or more second I/O requests 424 and 425, based on the wakeup time information WK_INFO included in the second command 423.

Figure 10:
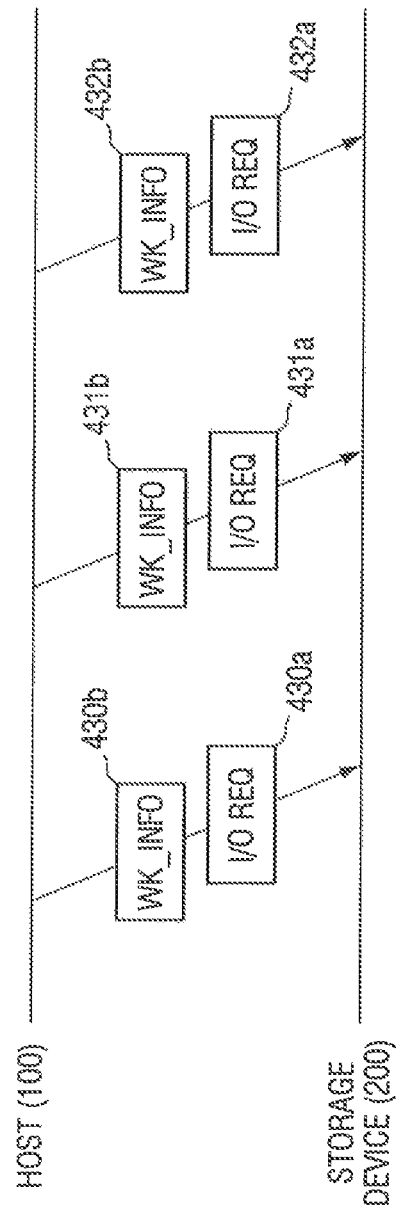
FIG. 10 is a diagram for explaining the operation of the semiconductor system according to an exemplary embodiment of the present disclosure.

FIG. 10 is a diagram for explaining the operation of the semiconductor system according to an embodiment of the present disclosure.

Referring to FIG. 10, the wakeup time information WK_INFO is transmitted from the host 100 to the device 200 together with the I/O request during operation of the storage device 200.

Specifically, the driver 120 of the host 100 transmits the wakeup time information WK_INFO 430*b*, 431*b* and 432*b* of each of the I/O requests 430*a*, 431*a* and 432*a* together with the I/O requests 430*a*, 431*a* and 432*a* via the host interface unit 140. For example, the driver 120 transmits the wakeup time information WK_INFO 430*b* together with I/O request 430*a* during a first time, transmits the wakeup time information WK_INFO 431*b* together with I/O request 431*a* during a second time, and transmits the wakeup time information WK_INFO 432*b* together with I/O request 432*a* during a third time.

The device controller 230 receives the wakeup time information WK_INFO 430*b*, 431*b* and 432*b* of each of the I/O requests 430*a*, 431*a* and 432*a* together with the I/O requests 430*a*, 431*a* and 432*a* from the host 100 via the device interface unit 240. For example, the device controller 230 receives the wakeup time information WK_INFO 430*b* together with I/O request 430*a* during a fourth time, receives the wakeup time information WK_INFO 431*b* together with I/O request 431*a* during a fifth time, and receives the wakeup time information WK_INFO 432*b* together with I/O request 432*a* during a sixth time.

Then, the device controller 230 sets a predetermined time for generating the interrupt in advance on the I/O request 430*a*, based on the wakeup time information WK_INFO 430*b*, and after processing of the I/O request 430*a*, the device controller 230 sets a predetermined time for generating the interrupt in advance on the I/O request 431*a*, based on the wakeup time information WK_INFO 431*b*. Similarly, the device controller 230 sets a predetermined time for generating the interrupt in advance on the I/O request 432*a* based on the wakeup time information WK_INFO 432*b* after the processing of the I/O request 431*a*.

The method of transmitting the wakeup time information WK_INFO between the host 100 and the storage device 200 as described above is merely an example, and the scope of the present disclosure is not limited thereto.

Figure 11:
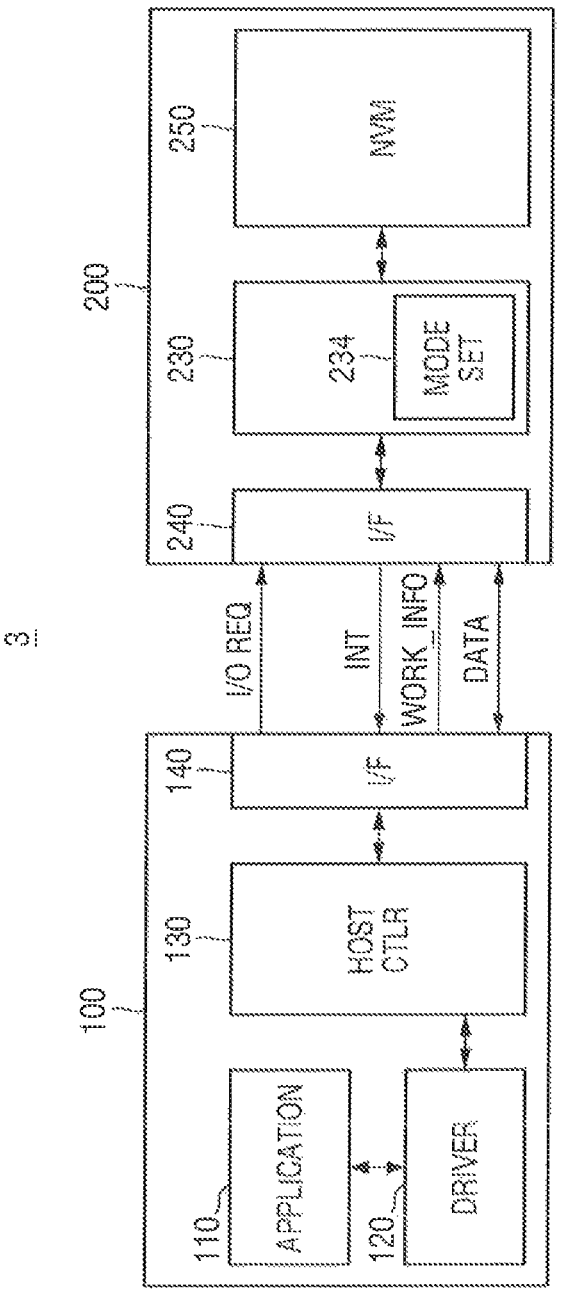
FIG. 11 is a block diagram for explaining the semiconductor system according to an exemplary embodiment of the present disclosure.
Figure 12:
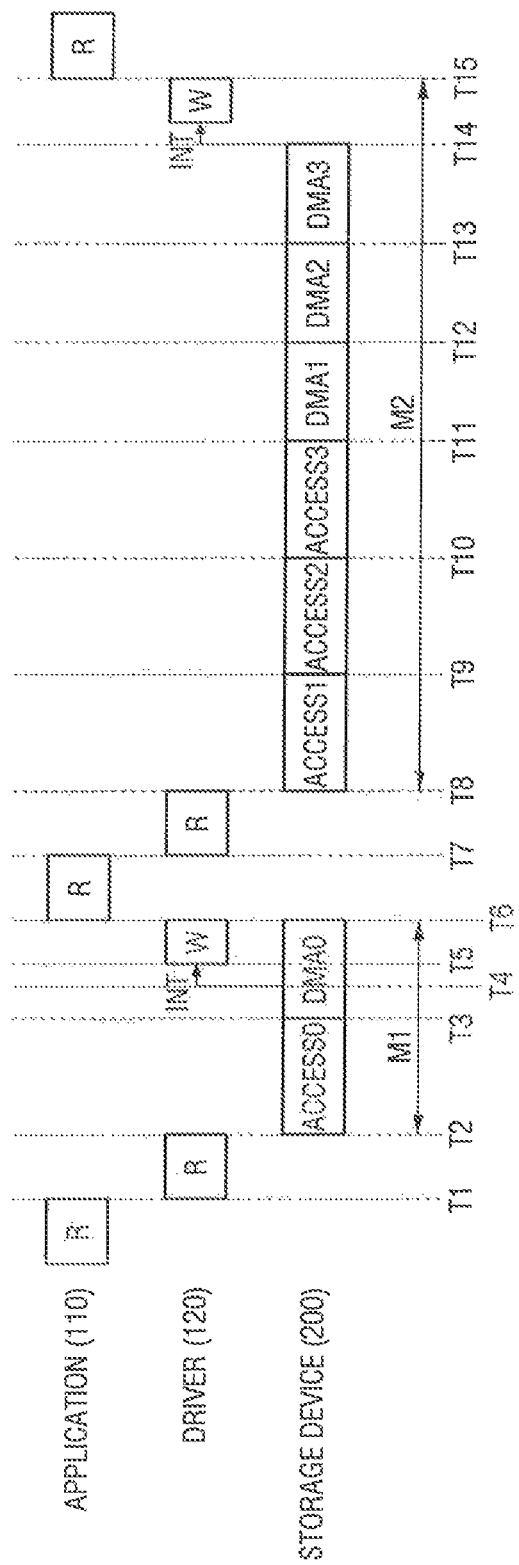
FIG. 12 is a diagram for explaining the operation of the semiconductor system according to an exemplary embodiment of the present disclosure.

FIG. 11 is a block diagram for describing a semiconductor system according to an embodiment of the present disclosure, and FIG. 12 is a diagram for explaining an operation of the semiconductor system according to an embodiment of the present disclosure.

Referring to FIG. 11, a semiconductor system 3 according to an embodiment of the present disclosure is different from the semiconductor system 1 of FIG. 1 in that a host 100 provides workload information WORK_INFO to the storage device 200.

In an embodiment, the driver 120 of the host 100 transmits the workload information WORK_INFO indicating the type of work associated with the I/O request to the storage device 200 via the host interface unit 140.

Then, the device controller 230 receives the workload information WORK_INFO via the device interface unit 240, and may change an operation of the storage device 200 in accordance with a value extracted from the workload information WORK_INFO.

In an embodiment where the workload information WORK_INFO has a first value, the device controller 230 transmits the interrupt corresponding to a single I/O request to the host 100. In an embodiment where the workload information WORK_INFO has a second value different from the first value, the device controller 230 transmits an interrupt corresponding to a plurality of I/O requests to the host 100. In this embodiment, the device controller 230 includes an operation mode setting module 234, and the operation mode setting module 234 sets the operation mode of the storage device 200 based on the received workload information WORK_INFO.

Here, the workload information WORK_INFO may indicate, for example, characteristics required by the I/O work. For example, if the workload information WORK_INFO has a first value, the associated I/O work may mean a low latency work in which latency is prioritized. Alternatively, if the workload information WORK_INFO has a second value, the associated I/O work may mean high throughput work in which the performance is prioritized. That is, the operation mode setting module 234 determines whether the I/O work corresponds to a low latency work or a high throughput work. In the low latency work, the operation mode setting module 234 generates the interrupt each time there is a single I/O request. In the high throughput work, the storage device 200 is controlled to set a plurality of I/O requests as a group and generate a single interrupt. For example, during high throughput work, a single interrupt is generated in response to processing a plurality of I/O requests.

Next, referring to FIG. 12, section M1 indicates processing of the low latency work and section M2 indicates processing of the high throughput work.

First at time T2, the storage device 200 receives an I/O request from the host 100. Then, the device controller 230 executes a data access ACCESS0 according to the I/O request on the non-volatile memory 250. Specifically, at intervals T2 to T3, the device controller 230 performs the data access such as a read, a write, or an erase on the non-volatile memory 250. At intervals T3 to T6, the device controller 230 transmits (DMA0) the data due to the data access to the host 100.

In particular, at time T4, the device controller 230 of the storage device 200 transmits an interrupt to the host 100 a predetermined time before completion of the data access. Also, the host interface unit 140 of the host 100 receives the interrupt data from the storage device 200 a predetermined time before completion of the data access according to the I/O request at time T5, and starts to wake-up.

That is, the device controller 230 of the storage device 200 transmits an interrupt to the host 100 during transmission of data due to the data access to the host 100, and the driver 120 of the host 100 receives an interrupt via the host interface unit 140 during reception of the data due to the data access from the storage device 200. Further, the driver 120 enters the wake-up state before the data transmission due to the data access has completed.

Next, at time T6, the device controller 230 provides the application 110, for example, with the data read and transmitted from the non-volatile memory 250 by the storage device 200, as a subsequent work of the processing completed by the storage device 200.

Next, at time T8, the storage device 200 receives a plurality of I/O requests from the host 100. Then, the device controller 230 executes a plurality of data accesses ACCESS1 to ACCESS3 according to the I/O requests on the non-volatile memory 250. At intervals T11 to T14, the device controller 230 transmits (DMA1 to DMA3) data due to the data accesses to the host 100.

In particular, at time T14, the device controller 230 of the storage device 200 transmits a single interrupt to the host 100 after completing the data accesses. Then, the host interface section 140 of the host 100 starts to wake-up after receiving the single interrupt.

Next, at time T15, the device controller 230 provides the application 110, for example, with the data read and transmitted from the non-volatile memory 250 by the storage device 200, as a subsequent work of the processing completed by the storage device 200.

In this way, when the I/O work corresponds to the low latency work, a method of minimizing the latency is used (interval M1), and when the I/O work corresponds to the high throughput processing, a method for reducing resource waste due to frequent interrupt processing is used (interval M2). Accordingly, it is possible to further improve the I/O processing performance and efficiency of the semiconductor system 3.

Figure 13:
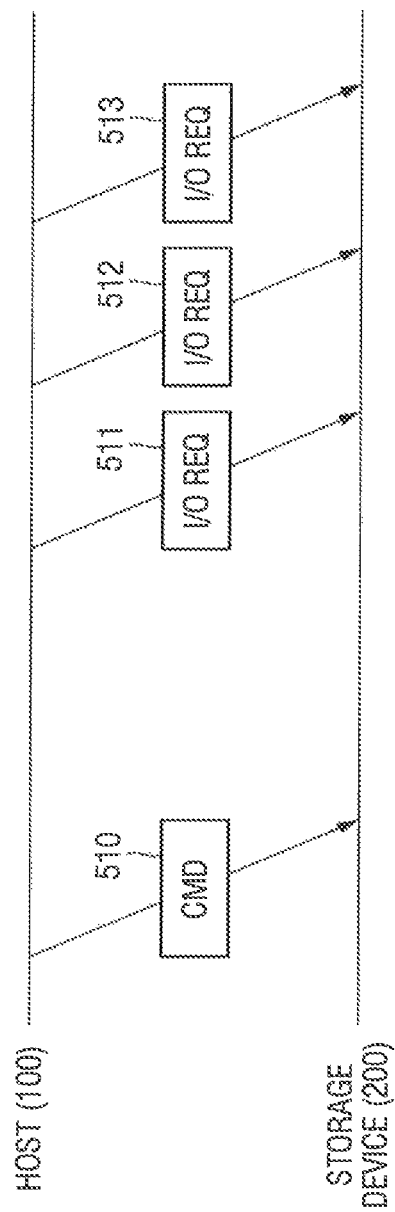
FIG. 13 is a diagram for explaining the operation of the semiconductor system according to an exemplary embodiment of the present disclosure.

FIG. 13 is a diagram for explaining an operation of the semiconductor system according to an embodiment of the present disclosure.

Referring to FIG. 13, the workload information WORK_INFO is transmitted from the host 100 to the device 200 in the form of another command or in the form of an administrator command at the same particular time as an initialization time of the storage device 200.

In an embodiment, after the driver 120 of the host 100 transmits the command 510 including the workload information WORK_INFO via the host interface unit 140, the driver 120 transmits one or more I/O requests 511, 512 and 513.

After receiving the command 510 including the workload information WORK_INFO from the host 100 via the device interface unit 240, the device controller 230 receives one or more I/O requests 511, 512 and 513.

Then, the device controller 230 may differently set the operation mode of the storage device 200 on one or more I/O requests 511, 512 and 513 in accordance with I/O work characteristics based on the workload information WORK_INFO included in the command 510.

Figure 14:
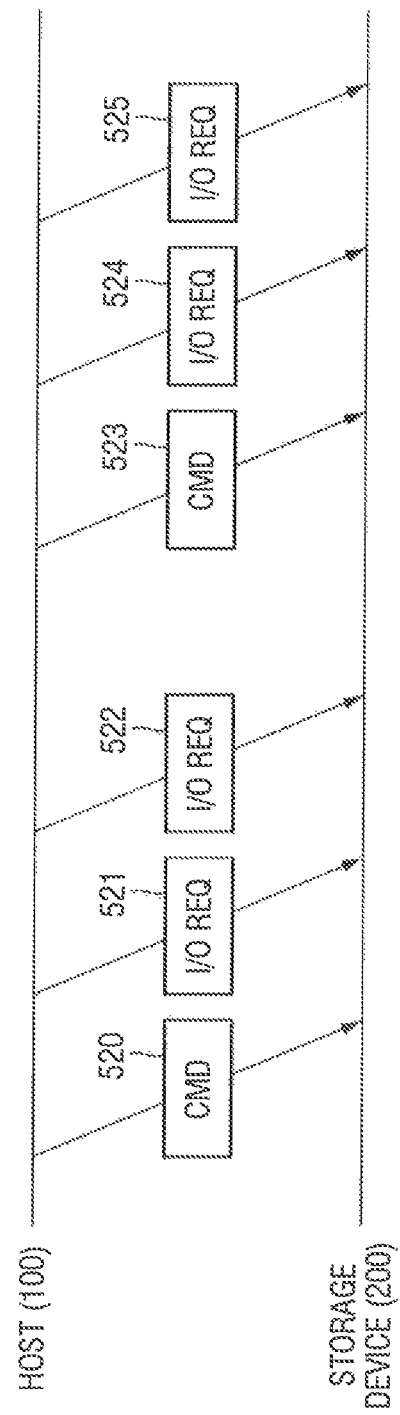
FIG. 14 is a diagram for explaining the operation of the semiconductor system according to an exemplary embodiment of the present disclosure.

FIG. 14 is a diagram for explaining the operation of the semiconductor system according to an embodiment of the present disclosure.

Referring to FIG. 14, the workload information WORK_INFO is periodically transmitted from the host 100 to the device 200 in the form of another command during an operation of the storage device 200.

In an embodiment, after the driver 120 of the host 100 receives the first command 520 including the workload information WORK_INFO of one or more first I/O requests 521 and 522 via the host interface unit 140, the driver 120 transmits a second command 523 including the workload information WORK_INFO of one or more second I/O requests 524 and 525.

After the device controller 230 receives the first command 520 including the workload information WORK_INFO of one or more first I/O requests 521 and 522 from the host 100 via the device interface unit 240, the device controller 230 receives the second command 523 including the workload information WORK_INFO of one or more second I/O requests 524 and 525.

Then, the device controller 230 may differently set the operation mode of the storage device 200 on one or more first I/O requests 521 and 522 in accordance I/O work characteristics I/O based on the workload information WORK_INFO included in the first command 530, and may differently set the operation mode of the storage device 200 on one or more second I/O requests 524 and 525 in accordance with I/O work characteristics based on the workload information WORK_INFO included in the storage command 523.

Figure 15:
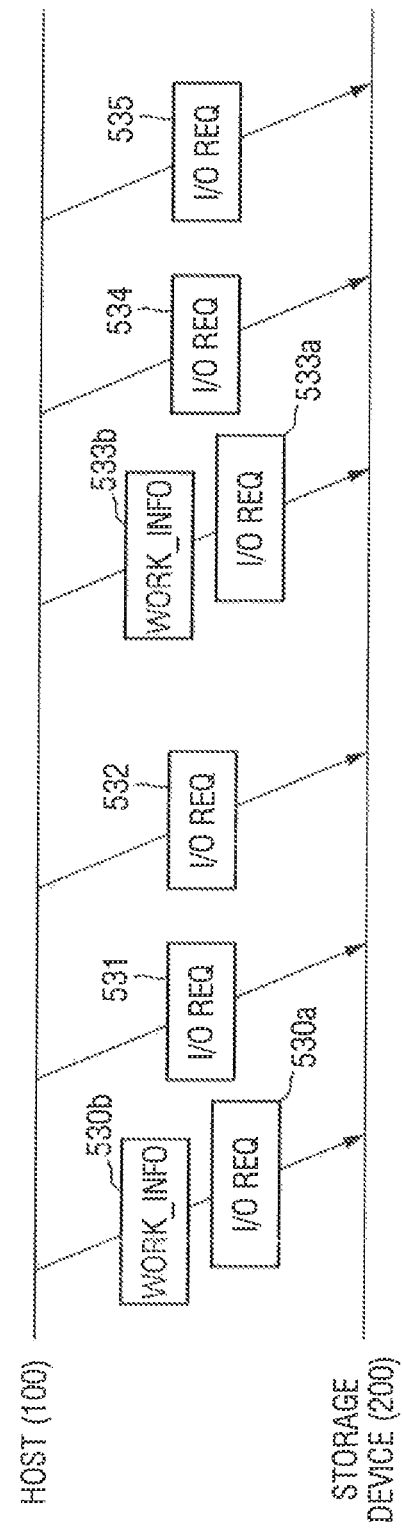
FIG. 15 is a diagram for explaining the operation of the semiconductor system according to an exemplary embodiment of the present disclosure.

FIG. 15 is a diagram for explaining an operation of the semiconductor system according to an embodiment of the present disclosure.

Referring to FIG. 15, the workload information WORK_INFO is transmitted from the host 100 to the device 200 together with the I/O request during operation of the storage device 200.

In an embodiment, the driver 120 of the host 100 transmits the workload information WORK_INFO 530b, 533b of each of the I/O requests 530a, 531, 532, 533a, 534 and 535 together with the I/O requests 530a, 533a via the host interface unit 140.

The device controller 230 receives the workload information WORK_INFO 530b, 533b of each of the I/O requests 530a, 531, 532, 533a, 534 and 535 together with the I/O requests 530a, 533a from the host 100 via the device interface unit 240.

Then, the device controller 230 may differently set the operation mode of the storage device 200 based on the I/O requests 530a, 531 and 532 in accordance with I/O work characteristics based on the workload information WORK_INFO 530b, and after processing the I/O requests 530a, 531 and 532, the device controller 230 may differently set the operation mode of the storage device 200 on the I/O requests 533a, 534 and 535 in accordance with I/O work characteristics based on the workload information WORK_ INFO 533b.

The method of transmitting the workload information WORK_INFO between the host 100 and the storage device 200 as described above referring to FIGS. 13 to 15 is merely an example, and the scope of the present disclosure is not limited thereto.

Figure 16:
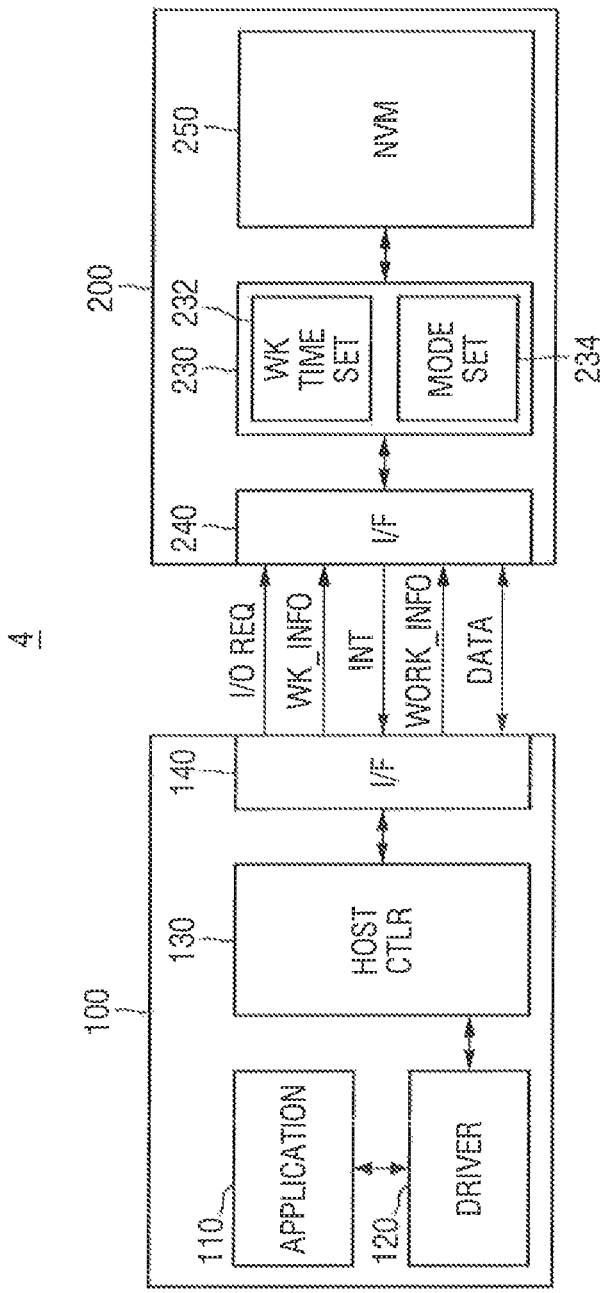
FIG. 16 is a block diagram for explaining the semiconductor system according to an exemplary embodiment of the present disclosure.

FIG. 16 is a block diagram for explaining a semiconductor system according to an embodiment of the present disclosure.

Referring to FIG. 16, a semiconductor system 4 according to an embodiment of the present disclosure is different from the semiconductor system 1 of FIG. 1 in that a host 100 provides wakeup time information WK_INFO and workload information WORK_INFO to the storage device 200.

That is, in this embodiment, the device controller 230 includes a wakeup time setting module 232, and the wakeup time setting module 232 determines a predetermined time based on the received wakeup time information WK_INFO. Further, the device controller 230 includes an operation mode setting module 234. The operation mode setting module 234 may set the operation mode of the storage device 200 based on the received workload information WORK_INFO.

Since the specific contents thereof may be duplicated with the contents described above with reference to FIGS. 6 to 15, an explanation thereof will not be provided.

Figure 17:
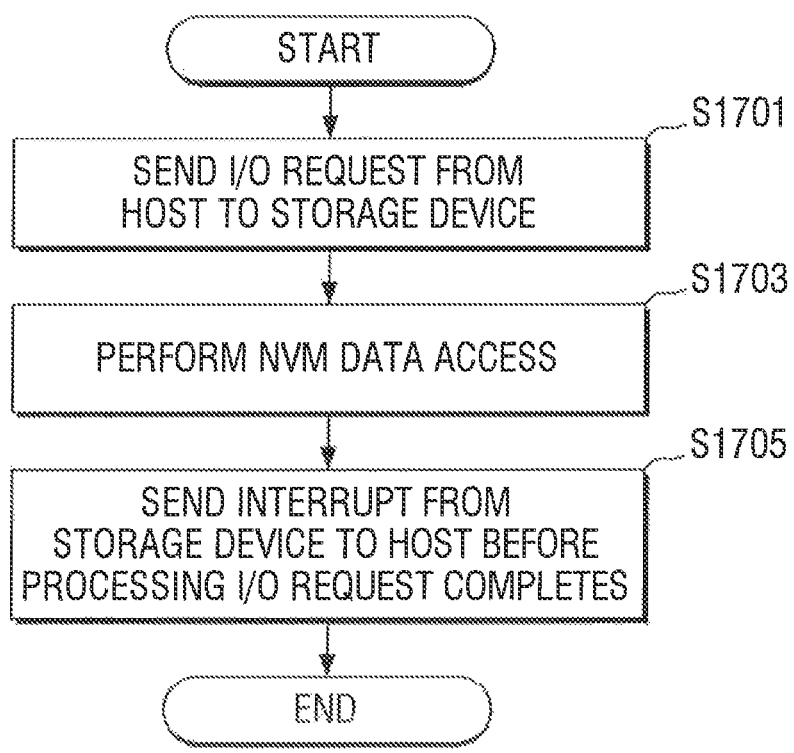
FIG. 17 is a flowchart for explaining the operation of the semiconductor system according to an exemplary embodiment of the present disclosure.

FIG. 17 is a flowchart for explaining an operation of the semiconductor system according to an embodiment of the present disclosure.

Referring to FIG. 17, the semiconductor system according to an embodiment of the present disclosure transmits an I/O request from the host 100 to the storage device 200 (S1701).

Next, the storage device 200 performs a data access on the non-volatile memory 250 (S1703). For example, the data access is performed according to the I/O request/

Next, before the data access according to the I/O request of the storage device 200 has completed, the semiconductor system transmits the interrupt from the storage device 200 to the host 100 (S1705).

Since the specific contents thereof are duplicated with the contents described above with reference to FIGS. 1 to 16, the description thereof will not be provided. For example, the interrupt and the time may be sent according to the methods described above with respect to FIGS. 1 to 16.

In concluding the detailed description, those skilled in the art will appreciate that many variations and modifications may be made to the embodiments disclosed above without substantially departing from the principles of the present disclosure.

What is claimed is:

1. A semiconductor device comprising:
a non-volatile memory;
a device interface circuit which receives at least one input/output (I/O) request generated at a host from a driver of the host, wherein the driver enters a sleep state after transmitting the at least one I/O request to the semiconductor device; and
a device controller which executes a data access between the non-volatile memory and the driver according to the I/O request on the non-volatile memory, and transmits an interrupt to the host a predetermined time before completion of the data access,
wherein the driver starts to wakeup from the sleep state upon receiving the interrupt and completes the wakeup within a period of time, and
wherein the device controller configures the data access to complete within the period of time after the driver receives the interrupt through an interrupt line separate from a data line for providing data of the data access,
wherein the interrupt informs the host that the non-volatile memory has completed the data access even though the non-volatile memory has not yet completed the data access,
wherein the device controller determines the predetermined time from wakeup time information received from the host including a numerical value obtained by averaging past times taken to complete the wakeup.

2. The semiconductor device of claim 1, wherein the device controller transmits the interrupt to the host, while transmitting data due to the data access to the host.

3. The semiconductor device of claim 1, wherein the device controller transmits the interrupt to the host, while executing the data access to the non-volatile memory.

4. The semiconductor device of claim 1, wherein the device controller receives first time information from the host through the device interface circuit, the first time information including information on a time taken until the driver of the host wakes up from the sleep state, and
the device controller determines the predetermined time based on the first time information.

5. The semiconductor device of claim 4, wherein the device controller receives second time information from the host through the device interface circuit, the second information including information on a time for transmitting data due to the data access to the host, and
the device controller determines the predetermined time based on the first time information and the second time information.

6. The semiconductor device of claim 1, wherein the device controller receives workload information from the host through the device interface circuit, the workload information indicating a type of work associated with the at least one I/O request.

7. The semiconductor device of claim 6, wherein, when the workload information has a first value, the device controller transmits the interrupt corresponding to a single I/O request to the host, and
when the workload information has a second value different from the first value, the device controller transmits the interrupt corresponding to a plurality of I/O requests to the host.

8. A semiconductor device comprising:
a driver which drives a storage device; and
a host interface circuit which transmits at least one input/output (I/O) request generated at a host including the driver from the driver to the storage device, and receives an interrupt from the storage device a predetermined time before completion by the storage device of a data access between the storage device and the driver according to the at least one I/O request,
wherein the driver starts to wakeup from a sleep state upon receiving the interrupt and completes the wakeup within a period of time, and
wherein the device controller configures the data access to complete within the period of time after the driver receives the interrupt through an interrupt line separate from a data line for providing data of the data access,
wherein the interrupt informs the host that the storage device has completed the data access even though the storage device has not yet completed the data access,
wherein the device controller determines the predetermined time from wakeup time information received from the host including a numerical value obtained by averaging past times taken to complete the wakeup.

9. The semiconductor device of claim 8, wherein the driver receives the interrupt, while receiving data due to the data access from the storage device through the host interface circuit.

10. The semiconductor device of claim 9, wherein the driver receives the interrupt through the host interface circuit before receiving data due to the data access from the storage device.

11. The semiconductor device of claim 8, wherein the driver transmits the wakeup time information to the storage device through the host interface circuit, the wakeup time information including information on a time taken until the driver wakes up from the sleep state.

12. The semiconductor device of claim 8, wherein the driver transmits workload information indicating a type of work associated with the at least one I/O request to the storage device through the host interface circuit.

13. A semiconductor system comprising:
a host and a storage device connected via an electrical interface,
wherein a driver of a host transmits at least one input/output (I/O) request generated at the host to the storage device, and receives an interrupt from the storage device a predetermined time before completion of a data access on the storage device according to the at least one I/O request, and
wherein the storage device receives the at least one I/O request from the host, performs the data access between storage device and the driver according to the I/O request on a non-volatile memory, and transmits the interrupt to the host the predetermined time before the completion of the data access, wherein the driver starts to wakeup from a sleep state upon receiving the interrupt and completes the wakeup within a period of time, and wherein the device controller configures the data access to complete within the period of time after the driver receives the interrupt, wherein the interrupt informs the host that the storage device has completed the data access even though the storage device has not yet completed the data access, wherein the device controller determines the predetermined time from wakeup time information received from the host including a numerical value obtained by averaging past times taken to complete the wakeup.

14. The semiconductor system of claim 13, wherein the host transmits first time information to the storage device, the first time information including information on a time taken until the driver for driving the storage device wakes up from the sleep state, and wherein the storage device determines the predetermined time based on the first time information.

15. The semiconductor system of claim 14, wherein the storage device receives second time information including information on a time when data due to the data access is transmitted to the host, and wherein the storage device determines the predetermined time based on the first time information and the second time information.

16. The semiconductor system of claim 14, the storage device receives the at least one I/O request after receiving a command including the first time information from the host.

17. The semiconductor system of claim 14, wherein the at least one I/O request corresponds to at least one first I/O request, the storage device receives a second command including the first time information of at least one second I/O request, after receiving a first command including the first time information of the at least one first I/O request from the host.

18. The semiconductor system of claim 14, wherein the storage device receives the wakeup time information from the host together with the at least one I/O request.

19. The semiconductor system of claim 13, wherein the host transmits workload information indicating a type of work associated with the at least one I/O request to the storage device.

20. The semiconductor system of claim 19, wherein, when the workload information has a first value, the storage device transmits an interrupt corresponding to a single I/O request to the host, and when the workload information has a second value different from the first value, the storage device transmits an interrupt corresponding to a plurality of I/O requests to the host.

* * * * *